US010841539B2

(12) United States Patent
Drinkard

(10) Patent No.: US 10,841,539 B2
(45) Date of Patent: Nov. 17, 2020

(54) METHOD AND APPARATUS FOR MONITORING ZONES

(71) Applicant: Omron Scientific Technologies, Inc., Fremont, CA (US)

(72) Inventor: John Drinkard, Foster City, CA (US)

(73) Assignee: OMRON SCIENTIFIC TECHNOLOGIES, INC., Fremont, CA (US)

( * ) Notice: Subject to any disclaimer, the term of this patent is extended or adjusted under 35 U.S.C. 154(b) by 281 days.

(21) Appl. No.: 15/793,668

(22) Filed: Oct. 25, 2017

(65) Prior Publication Data

US 2018/0048870 A1 Feb. 15, 2018

Related U.S. Application Data

(63) Continuation of application No. 13/298,416, filed on Nov. 17, 2011, now abandoned.

(60) Provisional application No. 61/414,761, filed on Nov. 17, 2010.

(51) Int. Cl.
| | |
|---|---|
| *H04N 7/18* | (2006.01) |
| *F16P 3/14* | (2006.01) |
| *G08B 13/196* | (2006.01) |

(52) U.S. Cl.
CPC .............. *H04N 7/181* (2013.01); *F16P 3/142* (2013.01); *F16P 3/144* (2013.01); *H04N 7/185* (2013.01); *G08B 13/1968* (2013.01); *G08B 13/19641* (2013.01); *G08B 13/19652* (2013.01)

(58) Field of Classification Search
CPC ................................. F16P 3/141; F16P 3/144
USPC .............................................. 700/13; 386/223
See application file for complete search history.

(56) References Cited

U.S. PATENT DOCUMENTS

| | | | |
|---|---|---|---|
| 6,081,606 | A | 6/2000 | Hansen et al. |
| 7,200,246 | B2 | 4/2007 | Cofer et al. |
| 7,674,052 | B2 | 3/2010 | Hirooka et al. |
| 7,680,295 | B2 | 3/2010 | Yoda et al. |
| 7,821,531 | B2 | 10/2010 | Yoda et al. |
| 2002/0061134 | A1 | 5/2002 | Cofer et al. |

(Continued)

FOREIGN PATENT DOCUMENTS

| | | |
|---|---|---|
| CN | 1543200 A | 11/2004 |
| CN | 1921622 A | 2/2007 |

(Continued)

*Primary Examiner* — Emilio J Saavedra
(74) *Attorney, Agent, or Firm* — Murphy, Bilak & Homiller, PLLC

(57) ABSTRACT

The present invention comprises an apparatus and method for monitoring a zone, which is a contiguous or non-contiguous, two-dimensional (2D) area or three-dimensional (3D) volume. Among its several advantages, the apparatus includes a plurality of sensors that monitor portions of the zone and report intrusion status to a control unit that provides monitoring boundary information to each of the sensors based on user input and further "maps" or otherwise associates each sensor to control unit outputs in accordance with user-defined behaviors. Still further, as a meaningful aid for configuring monitoring boundaries used by the sensors for objection intrusion detection, in one or more embodiments of the apparatus and method, at least a subset of sensors use a common coordinate frame of reference, based on a common origin located within overlapping sensor fields of view.

9 Claims, 6 Drawing Sheets

(56) References Cited

U.S. PATENT DOCUMENTS

| | | | |
|---|---|---|---|
| 2003/0085992 A1* | 5/2003 | Arpa | G08B 13/19608 |
| | | | 348/47 |
| 2007/0035627 A1 | 2/2007 | Cleary et al. | |
| 2007/0217780 A1* | 9/2007 | Hirooka | G06T 7/593 |
| | | | 396/287 |
| 2009/0015663 A1* | 1/2009 | Doettling | F16P 3/14 |
| | | | 348/46 |
| 2009/0086189 A1 | 4/2009 | Drinkard | |
| 2010/0053330 A1* | 3/2010 | Hellickson | G01S 17/023 |
| | | | 348/153 |
| 2010/0149330 A1* | 6/2010 | Salgar | G08B 13/19686 |
| | | | 348/143 |
| 2010/0194859 A1* | 8/2010 | Heigl | G08B 13/1968 |
| | | | 348/46 |
| 2012/0123563 A1 | 5/2012 | Drinkard | |

FOREIGN PATENT DOCUMENTS

| | | |
|---|---|---|
| CN | 101119478 A | 2/2008 |
| CN | 101489120 A | 7/2009 |
| CN | 101855906 A | 10/2010 |
| EP | 1341383 | 9/2003 |
| JP | H11165291 A | 6/1999 |
| JP | 2003162776 A | 6/2003 |
| JP | 2004246856 A | 9/2004 |
| JP | 2004535616 A | 11/2004 |
| JP | 2005277705 A | 10/2005 |
| JP | 2006059185 A | 3/2006 |
| JP | 2006103857 A | 4/2006 |
| JP | 2007249722 A | 9/2007 |
| WO | 9749061 | 12/1997 |
| WO | 03025859 A1 | 3/2003 |

\* cited by examiner

METHOD AND APPARATUS FOR MONITORING ZONES

RELATED APPLICATIONS

This application is a continuation of U.S. application Ser. No. 13/298,416 filed on Nov. 17, 2011, which claims benefit of U.S. Provisional Application No. 61/414,761 filed on Nov. 17, 2010. The entire contents of each of the aforementioned applications are incorporated herein by reference.

TECHNICAL FIELD

The present invention generally relates to monitoring zones, such as the area or volume around a hazardous machine, secure location, or Autonomous Guided Vehicle (AGV), and particularly relates to the use of multiple sensors for zone monitoring.

BACKGROUND

Monitoring systems, such as laser scanners and stereoscopic camera systems, are often used for monitoring a zone established by configured boundaries. During run time, such systems detect the presence and measure the positions of objects bigger than a minimum object detection size, and compare these positions with the configured monitoring boundaries. Such a monitoring system then "decides" whether or not an intrusion has occurred for each considered boundary. Illumination of the area, whether it is intrinsically part of the monitored environment, or supplied actively by the system itself, is necessary for proper operation of such systems.

Such systems enable remote area or volume monitoring. This feature has the advantage that a zone (e.g., a large area or volume) may be monitored from a distance that places the zone monitoring system out of harm's way. For instance, the sensors for such systems, e.g., cameras, laser scanners, etc., avoid damage from collisions with machinery in operation or from pollutants that may be present close to or within the monitored area. To facilitate configuration of zone boundaries and operating mode behaviors, and to provide association of monitored boundaries to safety or diagnostic outputs, the sensor of such a monitoring system interfaces with a corresponding control unit that often is mounted in a more conveniently accessed location.

Known examples include the SAFETYEYE system distributed by Pilz Automation Safety, L.P., having a business address of 7150 Commerce Boulevard, Canton, Mich. 48187. Also, see the related U.S. Patent Publication US 2009/0015663 A1.

Note that when the sensor is operated from a distance, the problem of optical shadowing must be considered, as it is often the case that overhead beams, gantries, cables, or other structures exist in the view of monitored areas. Removing such obstructions represents an obvious solution to such shadowing problems, but obstruction removal is not always viable or even possible. Another option involves using multiple sensors aimed at the monitored zone from different angles and positions. With proper placement, at least one sensor will have a clear view of the monitored area at any given time. Use of multiple sensors from different views also addresses the case where tall structures in the monitored area cast shadows in the sensor field of view that may overlap with the intended monitored area.

As with many solutions, however, the solution itself introduces new challenges. For example, the amount of processing required for establishing the proper monitoring function scales with the number of sensors. Consequently, vision systems that use multiple sensors have very high overall processing burdens. That burden ultimately causes the control unit cost and performance to scale with the number of sensors used in the application. In turn, the need for high-performance vision processing makes it difficult for the customer to scale a solution to properly match to the monitoring task.

Another problem is that each sensor in a multi-sensor system is commonly provided with its own I/O. This configuration creates an abundance of wiring and external control logic that may not be needed when, for instance, there are only a small number of machines to control for a large number of sensors. Note that this is also the case for applications such as autonomous guided vehicle safety control, where it is common to have up to four or more laser scanners on a guided vehicle.

SUMMARY

The present invention comprises an apparatus and method for monitoring a zone, which is a contiguous or non-contiguous, two-dimensional (2D) area or three-dimensional (3D) volume. Among its several advantages, the apparatus includes a plurality of sensors that monitor portions of the zone and report intrusion status to a control unit that provides monitoring boundary information to each of the sensors based on user input and further "maps" or otherwise associates each sensor to control unit outputs in accordance with user-defined behaviors. Still further, as a meaningful aid for configuring monitoring boundaries used by the sensors for objection intrusion detection, in one or more embodiments of the apparatus and method, at least a subset of sensors use a common coordinate frame of reference, based on a common origin located within overlapping sensor fields of view.

In one aspect, then, the present invention comprises a monitoring apparatus that includes a plurality of sensors, each configured to monitor for intrusions according to a configured boundary and each having a communication interface for sending monitoring information indicating intrusion detections and receiving configuration data defining the configured boundary to be monitored by each sensor. In a non-limiting example, the sensors, which are also referred to as "sensor heads," each comprise sensing circuitry for obtaining raw sensor data representing the sensor's field of view, along with processing circuitry for processing the raw sensor data, for object detection and intrusion monitoring. As non-limiting examples, the sensors comprise stereoscopic camera systems or laser scanners, or a mix thereof. That is, the sensors may be homogenous or heterogeneous in type.

The monitoring apparatus further includes a control unit having a communication interface for receiving the monitoring information from each sensor, including intrusion detection information, and for sending sensor configuration data to each sensor. Advantageously, the control unit includes a number of outputs for providing signals to external devices. At least some of these outputs are, for example, Output Signal Switching Device (OSSD) safety outputs used to energize/de-energize hazardous machinery within the monitored zone, or to perform some other safety-related switching function. Other ones of the outputs may relate to various status monitoring, diagnostics, or control functions.

The control unit further includes one or more processing circuits configured to control the outputs according to a defined control unit configuration, wherein the control unit configuration defines control responses for the sensors. In this regard, the control unit configuration data defines the control response for each sensor, such that the control unit may be understood as mapping or otherwise associating each sensor with one or more particular ones of the outputs, according to the defined control unit configuration. This feature allows the control unit to behave differently with respect to each sensor or with respect to different groups of its sensors. For example, the control response configured for each sensor defines how the control unit controls its outputs and/or which outputs it controls, on a per-sensor or per sensor group basis. Consequently, a user can configure different behavior (control responses) for intrusion detection and other events reported from the sensors, on a per sensor or sensor-group basis.

The control unit also includes a configuration interface operatively associated with the one or more processing circuits, for receiving the control unit configuration data, thereby defining the control unit configuration. The configuration interface comprises, for example, a computer interface, such as USB, Ethernet or another PC-compatible interface. The configuration interface allows allow the control unit to receive the control unit and/or sensor configuration data from an external configuration unit, which may be laptop or other PC.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
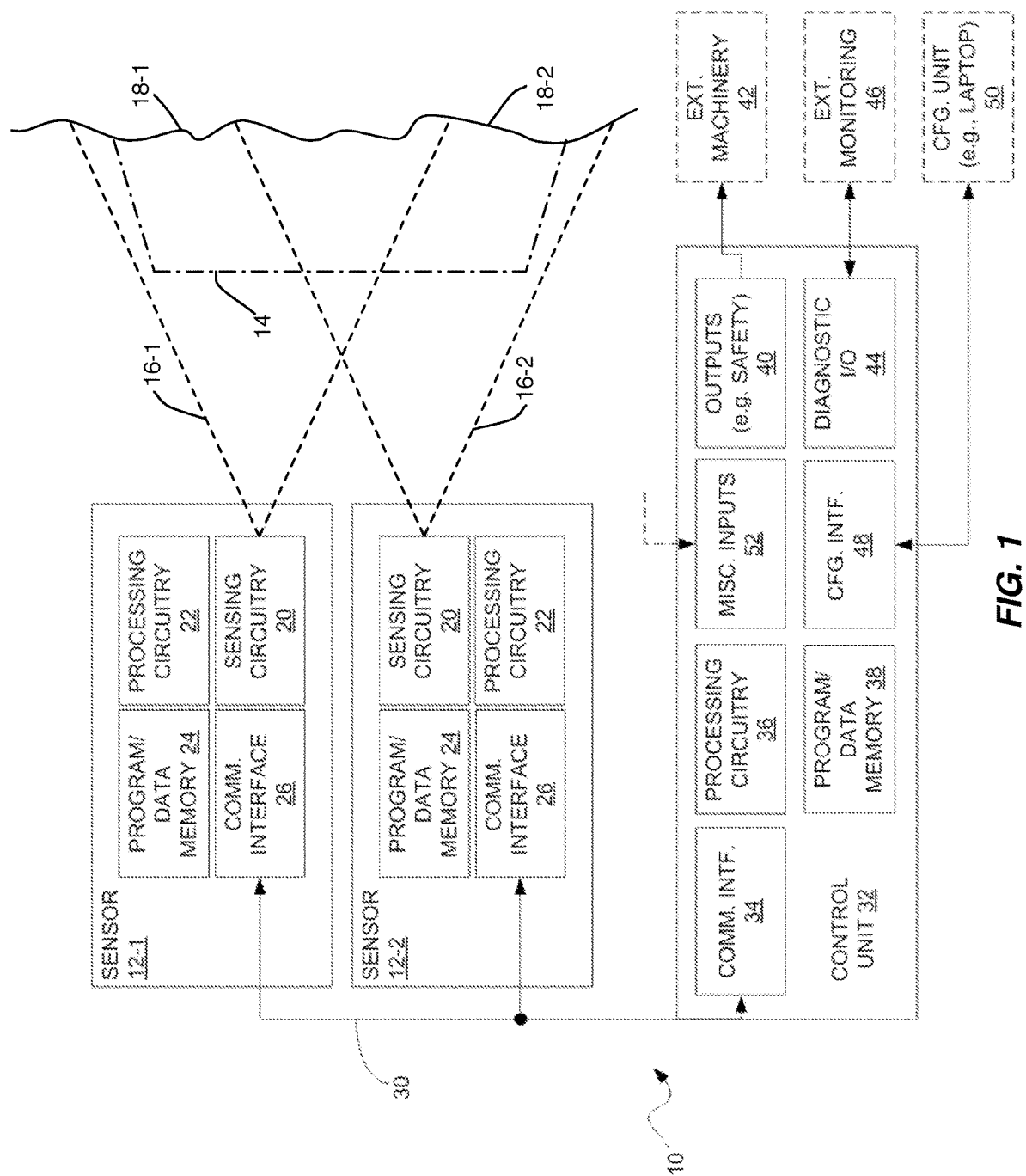
FIG. 1 is a block diagram of one embodiment of a monitoring apparatus.

FIG. 1 illustrates a monitoring apparatus 10 (hereafter "apparatus 10") as contemplated herein, according to one example embodiment. The apparatus 10 may be understood as a type of monitoring system, a plurality of sensors 12 are configured to monitor all or part of a monitoring zone 14. Here, the "monitoring zone" 14 comprises a contiguous or non-contiguous two-dimensional area or three-dimensional volume to be monitored collectively by the sensors 12. Note that two sensors 12-1, and 12-2 are shown by way of example, but more sensors 12 could be used and further note that "sensors 12" is used in the generic plural sense and "sensor 12" is used in the generic singular sense.

As one example, the monitoring zone 14 is a more or less continuous three-dimensional space, but it includes obstructions or features that prevent a single sensor 12 from "seeing" the entire space. Therefore, by using two or more sensors 12, each having a different field of view 16 into the monitoring zone 14, that apparatus 10 provides for full monitoring of the monitoring zone 14. Note that the "field of view" 16 for a given sensor 12 may be along a two-dimensional plane or in a three-dimensional space, and note that the shape or extents of the field of view 16 of a given sensor 12 is defined by a configured boundary 18. Thus, in the example, sensor 12-1 monitors within a zone defined by its configured boundary 18-1 and sensor 12-2 monitors within a zone defined by its configured boundary 18-2. The boundaries 18 may be configured to overlap or extend between sensors 12, and the portion of the monitored zone 14 that is monitored by each sensor 12 may at least partially overlap with that of one or more other sensors 12.

In general, each sensor 12 comprises an assembly, e.g., a housing, connectors, etc., and includes certain functional circuitry. The illustrated sensors 12 each include sensing circuitry 20, processing circuitry 22, program/data memory 24, and a communication interface 26. The sensing circuitry 20 comprises, for example, a laser scanner or one or more cameras or other imaging sensors. See U.S. Pat. No. 7,965,384 for example details regarding laser scanning optics electromechanical elements, and associated circuitry.

In at least one embodiment, the sensing circuitry 20 of at least one sensor 12 comprises a camera. In a related embodiment, the sensing circuitry 20 of at least one sensor 12 comprises a stereoscopic camera system. Notably, however, the sensors 12 may not be homogenous; that is, one or more of the sensors 12 may use a first detection technology (e.g., laser scanning), while one or more other ones of the sensors 12 use a second detection technology (e.g., camera or other imaging sensor based machine vision).

It will be understood then that the processing circuitry 22 in each sensor 12 is configured as appropriate for the sensing technology implemented by the sensing circuitry 20. For example, where the sensing circuitry comprises a 2D or a 3D camera-based vision system, the processing circuitry 22 is configured to carry out image-processing algorithms, e.g., for object detection processing. The configuration and specific processing may be at least partially implemented according to computer program instructions stored in the program/data memory 24. Of course, the specific configuration of the sensor's monitoring, e.g., the shape, contour, or dimensional extents information defining the configured boundary 18 used by the sensor to define its monitored zone also may be loaded into and stored by the program/data memory. Thus, the program/data memory 24 may comprise more than one memory device and/or more than one type of memory, such as SRAM for working data and EEPROM, FLASH or other non-volatile, writeable memory for program and/or configuration data storage.

Further, in at least one embodiment, the processing circuitry 22 includes communication capabilities, e.g., the processing circuitry 22 sends and receives control and data messages according to a defined communication protocol. To this end, each sensor 12 includes a communication interface 26 that couples the sensor 12 to a communication link 32, which in turn provides communicative coupling between the plurality of sensors 12 and an associated control unit 32. The communication interface 26 comprises, for example, the physical-layer circuitry required to communicate on a given medium, e.g., a wired and/or wireless network. In at least one embodiment, the communication interface 26 comprises an Ethernet interface, and the sensor 12 may be configured to receive power via connection to powered Ethernet via the communication interface 26.

The control unit 32 has a corresponding compatible communication interface 34, for communicating with each sensor 12 over the communication link(s) 30. In the illustrated embodiment, the intelligence for managing such communications resides in the processing circuitry 36 of the control unit 32. In at least one example, the processing circuitry 36 comprises one or more processing circuits that are configured via hardware, software, or both, to implement the operational behavior of the control unit 32. In at least one such embodiment, the control unit 32 comprises a microcontroller or other type of microprocessor, and program, working, and configuration data to support such processing may be stored in the program/data memory 38.

The control unit 32 further includes a number of outputs 40 (e.g., electrical output circuits, each providing an output signal that selectively asserted or otherwise controlled by the control unit 32). In at least one embodiment, at least some of these outputs 40 are safety outputs (OSSD outputs, for example), for controlling external machinery 42, responsive to intrusion detection information from the sensors 12. Such machinery comprises, for example, a manufacturing machine or robot, or an AGV. Thus, the control unit 32 may shut down or alter operation of one or more external machines 42, via its outputs 40.

The control unit 32 in at least one embodiment further includes diagnostic input/output (I/O), which allows, for example, non-safety signaling from the control unit 32. Such signaling, for example, allows for monitoring the control unit state, and the interface circuits constituting the I/O 44 may be connected with various external monitoring systems, such as factory-floor networks, etc.

The control unit also may include a configuration interface 48, which may comprise a computer interface, such as USB, Ethernet or another PC-compatible interface. The configuration interface 48 is configured (in conjunction with the processing circuitry 36) to allow the control unit 32 to receive configuration data from an external configuration unit 50, which may be laptop or other PC.

Thus, as a non-limiting example, the apparatus 10 includes a control unit 32 and a number of sensors 12, with each sensor communicatively linked to the control unit 32. An authorized user (not shown in the figure) attached a computer to the control unit 32 via the configuration interface 48 and executes a configuration program that allows the user to define the configuration boundary 18 of each sensor 12, and to map or otherwise associate each sensor 12 with specific ones of the outputs 40. More broadly, in at least one embodiment, the "behavior" of the control unit 32 is configurable with respect to each sensor 12. As an example, the particular safety outputs among the collection of outputs 40 that are energized or de-energized based on intrusion detection events reported by a particular one of the sensors is configurable, via the configuration interface 48. Different sensors 12 can be mapped to different safety outputs, and this allows the control unit 32 to energize (or de-energize) certain ones of the outputs 40 in response to object detection by certain ones of the sensors 12. Moreover, different zones, configured for a given sensor, and therefore monitored simultaneously by that sensor, can be mapped to different outputs on the control unit The flexibility to attach an array of sensors 12 to the control unit 32, and to logically configure how the control unit 32 responds to intrusion detection in dependence on which one or ones of the sensors 12 detects the intrusion provides great flexibility for machine guarding and AGV control.

Figure 2:
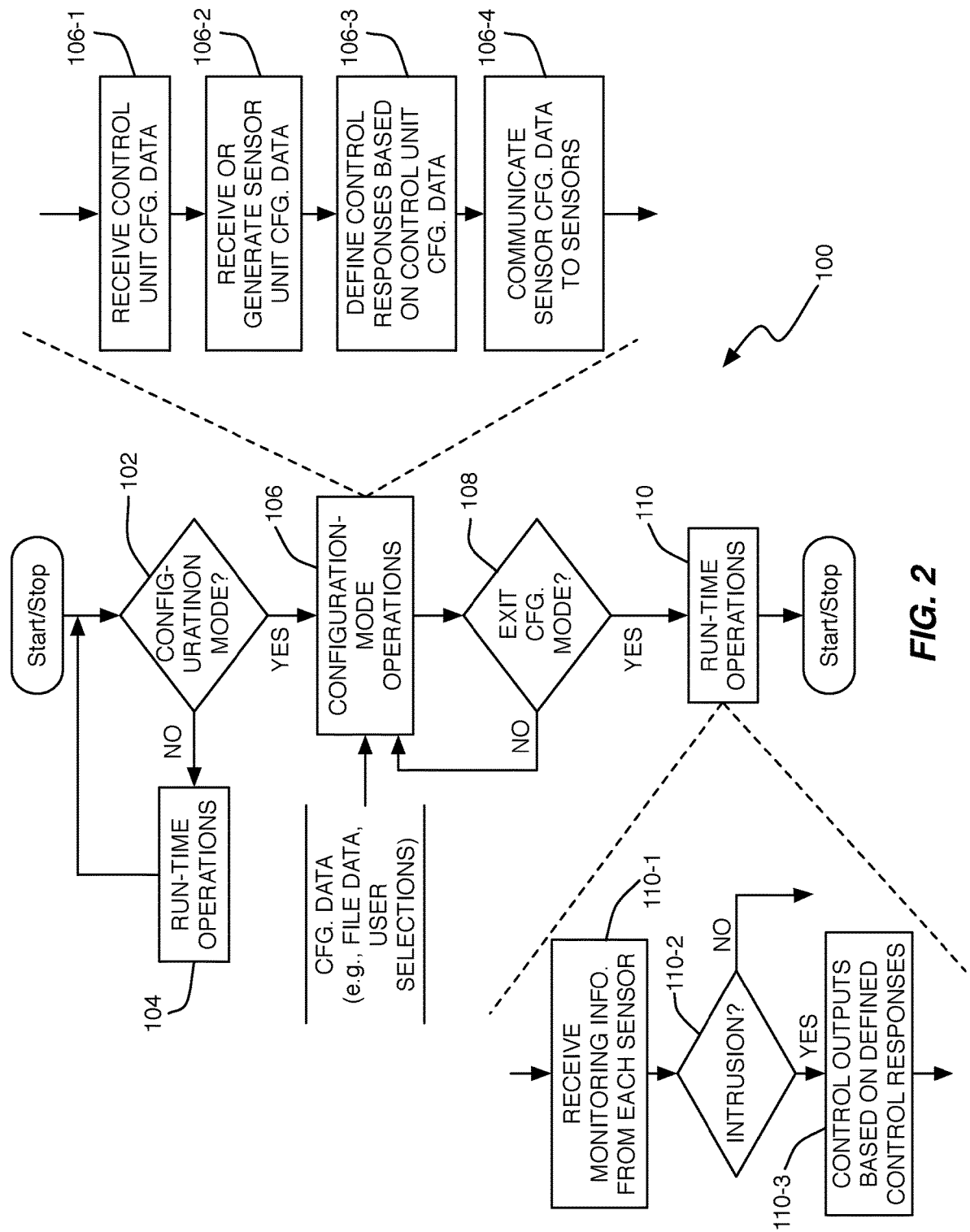
FIG. 2 is a logic flow diagram of one embodiment of a method of zone monitoring.

FIG. 2 illustrates one embodiment of a method 100 of operation for the apparatus 10. In one example, the apparatus 10 is configured to perform the illustrated operations by the processing circuitry 36 executing computer program instructions stored in the program/data memory 38. Of course, it will be understood by those of ordinary skill in the electrical design arts that at least some of the illustrated processing can be performed in dedicated hardware and/or discrete circuitry in the apparatus 10.

The method 100 includes monitoring for configuration mode activation, or otherwise determining by the control unit 32 whether it should enter configuration mode (YES OR NO from Block 102). If not, and assuming that the control unit 32 has a valid configuration in its memory, it performs or otherwise continues with run-time operations (Block 104), which in one or more embodiments entail a series of complex monitoring and self-verification operations, related not only to verifying communication integrity with the sensors 12, but also verifying proper integrity and control of its outputs 40 and/or 44.

If the control unit 32 detects that it should enter configuration mode, such as it will when powered on without valid configuration data in its memory, processing continues with configuration mode operations (Block 106). In at least one embodiment, Block 106 includes receiving control unit configuration data (Block 106-1), receiving or generating sensor configuration data (Block 106-2), defining control unit behavior (the control responses) of the control unit 32 with respect to intrusion detection by each sensor 12, in accordance with the received control unit configuration data (Block 106-3), and communicating the sensor configuration data to the sensors 12 (Block 106-4).

In one embodiment, a primary aspect of the control unit configuration is concerned with the association of monitored zones with control unit I/O (e.g., outputs 40 and/or 44 and/or misc. inputs 52), and whether or not the user desires a particular operating mode (e.g. AUTOMATIC RESTART, START/RESTART INTERLOCK, etc.), to be triggered responsive to intrusion detection information from each particular sensor 12. In the same or another embodiment, the boundary 18 for each sensor 12 is constructed using, e.g., a software tool on an attached laptop or other PC, which is supported by the control unit's configuration interface 48. The data defining the configured boundaries 18 is sent from the attached computer to the control unit 32, which then sends it to the correct sensor 12. Alternatively, data from the attached computer is sent to the control unit 32, which then generates boundary information from it, or otherwise translates the received data into corresponding boundary information.

The configured boundary 18 for each sensor 12 is associated with OSSDs and/or other outputs on the control unit 32. Further, in at least one embodiment, the control unit 32 is configured to provide a "zone select" function that acts on the boundary 18 in one or more of the sensors 12, wherein each such boundary 18 has its own associations with the control unit outputs 40 and/or 44. In the case of "zone" select functionality, monitoring of multiple zones is realized through input selection—for example zone selection details, see the commonly owned U.S. Pat. No. 8,018,353, issued on 13 Sep. 2011.

Notably, different sensor configuration data may be provided to each sensor, based on its location with respect to the monitored zone and its intended monitoring functions, and based on its type (e.g., laser, camera, etc.). This feature allows the configured boundary 18 and other monitoring parameters of each sensor 12 to be configured on an individual basis. Further, the control unit configuration data allows an individualized control response to be defined for the control unit 32, with respect to each sensor 12. This feature allows a user to configure the control unit behavior differently for different sensors 12, meaning that the response of the control unit 32 to intrusion detection by one sensor 12 can be different than its response to object intrusion detection by another sensor 12. Of course, the control response can be the same across defined groups of sensors 12, and yet still be different between different groups of sensors 12.

Of further note, the configuration data received by the control unit 32 may come, e.g., from an attached laptop computer of other configuration device 50, such as was shown in FIG. 1. In this regard, the configuration device 50 and/or the control unit 32 provide a user interface facilitating configuration choices and data input by the user. In one example, the control unit 32 provides sensor data from one or more of the sensors 12—e.g., a camera view or other representation of a field of view into the monitored zone)— for display to the user. In at least one such embodiment, the user draws or otherwise sees graphical overlays on the field of view, representing configuration boundaries, etc.

When the configuration mode is terminated (YES from Block 108), processing continues to run-time operations (Block 110), although it will be appreciated that "run-time" does not necessarily mean that the control unit 32 allows safety-critical outputs 40 to be energized automatically upon exiting configuration mode. It should further be understood that exiting configuration mode and/or allowing the "on" or "run" state of any of its safety critical outputs 40 requires, at a minimum, verification of valid configuration data.

During run-time operations, the control unit 32 receives monitoring information from each sensor 12 (Block 110-1), monitors that information for intrusion detection information from any of the sensors 12 (Block 110-2), and controls its outputs 40 and/or 44 according to the control response defined for the sensor 12 from which the intrusion detection information was received (Block 110-3). In particular, as noted, the control unit configuration data received by the control unit 32 is used by the control unit 32 to determine how it responds to intrusion detection by particular ones of the sensors 12. While it may exhibit uniform behavior with respect to all sensors 12, if so configured by the user, the user may also tailor the response of the control unit 32 to each particular sensor 12 and/or to particular groups of sensors 12. As one example, this feature allows the particular outputs 40 and/or 44 to be exercised when intrusion detection signaling is received from a particular sensor 12.

Figure 3:
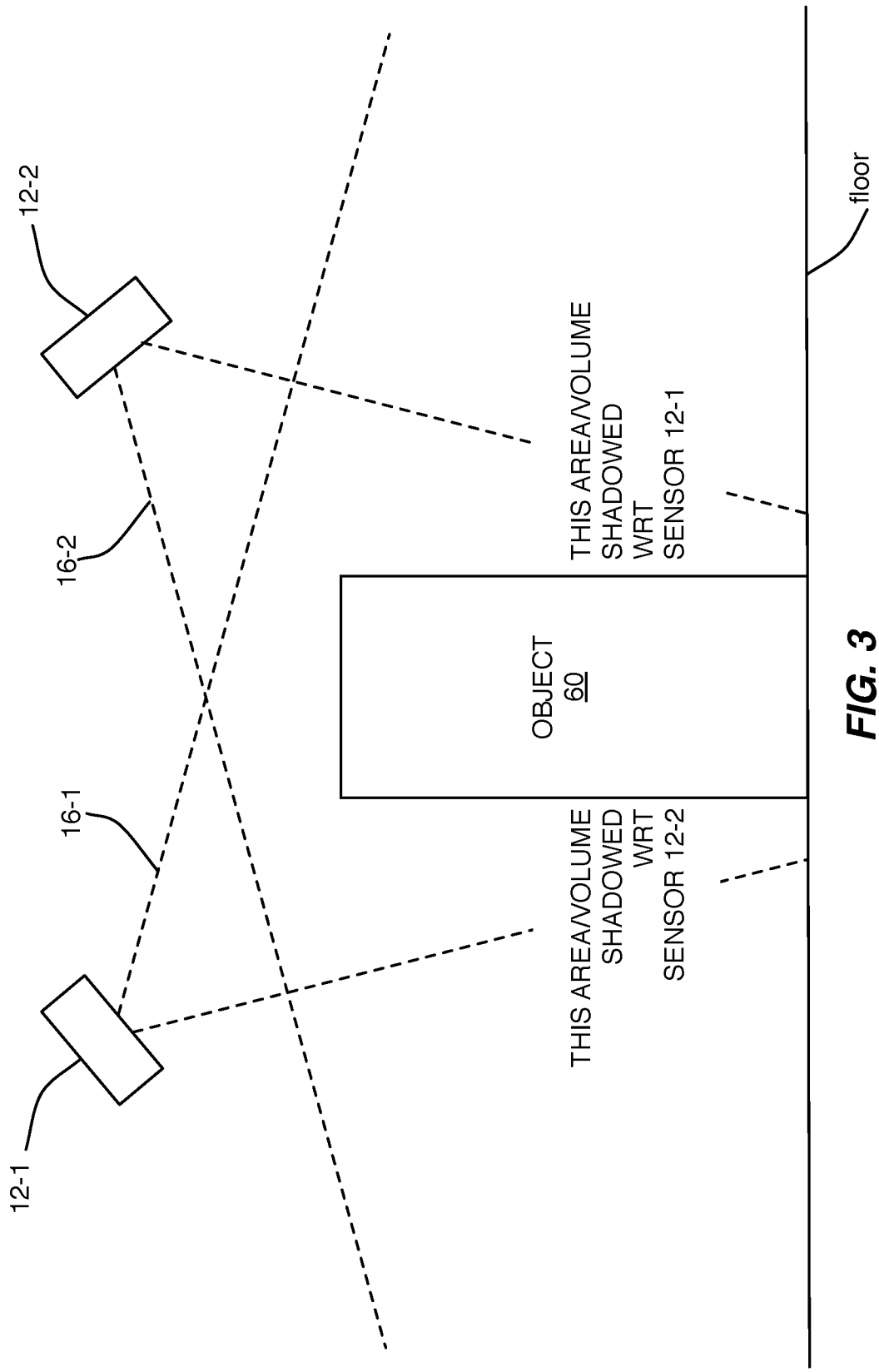
FIG. 3 is a block diagram illustrating the use of multiple sensors positioned at different viewing angles.

FIGS. 1 and 2 will be understood as representing structural/functional and operational examples for a monitoring apparatus 10 that is configured for detecting intrusions within large areas (or volumes), where the monitored area (or volume) is such that one sensor 12 alone cannot achieve the desired coverage due to shadows in the sensor field of view, or limitations in the sensor field of view. See FIG. 3 for an example of this case, where one sees an object 60—e.g., an industrial robot or other hazardous machine sitting on a factory floor—where the area or volume on one side of the object 60 is shadowed with respect to ("WRT" in diagram) to sensor 12-1 but visible to sensor 12-2, and where the area or volume on the other side of the object 60 is shadowed WRT to sensor 12-2 but is visible to sensor 12-1.

The use of multiple sensors 12 allows full monitoring of the zone 14, even with shadowing, etc., and in one or more embodiments herein the apparatus 10 includes a plurality of sensors 12 which each detect intrusions into respective portions of the monitored area (or volume) 14. The apparatus 10 further includes a control unit 32 that associates intrusions into the respective portions of the monitored area (or volume) to control outputs 40 and/or 44, which are used for machine control or diagnostic functions.

The apparatus 10 further includes a communication interface 34 communicatively linking the sensors 12 with the control unit 32 that allows each of the sensors to communicate intrusion status with respect to its configured boundaries 18 to the control unit 32. Here, it should be noted that the boundary/boundaries 18-*x* configured for one of the sensors 12-*x* may be a line, a contour, or other two-dimensional boundary, or may be a three-dimensional boundary defining a bounded volume (which itself may be defined at least in part by real world objects, such as barriers, walls, etc.).

The control unit 32 further includes a configuration interface 48 that allows users to configure each sensor 12 and the control unit 32, with an external device 50 such as a portable computer. Again, it should be noted that configuring the apparatus 10 in an overall sense includes configuring the sensors 12 and configuring the control unit 32. The configuration interface 48 enables the control unit 32 to receive both sensor configuration data and control unit configuration data.

In at least one embodiment, the control unit 32 includes a configuration program that allows users to create monitoring boundaries 18 and assign them to sensors 12 and transmit them to individual sensors 12, or groups of sensors 12, over the communication interface 34. That is, sensor configuration data is sent from the user's configuration device 50 (or entered directly into the control unit 32 via the configuration device 50), and the control unit then sends that configuration data 12 to the targeted sensors 12. In another embodiment, the configuration program, or at least a portion of it, resides on the configuration device 50 and communicates with the control unit 32 according to a defined protocol that enables the control unit 32 to parse the incoming data and recognize sensor configuration data parameters and control unit configuration parameters.

In any case, in at least one embodiment the same or another configuration program includes program instructions that, when executed, allow the user to set the safety parameters of each sensor 12, such as object detection size and speed of detection (response time). Further, the same or another configuration program includes program instructions that, when executed, allow the user to associate intrusions with respect to configured boundaries 18 to control and/or diagnostic outputs 40 and/or 44 on the control unit 32. This feature can be understood as allowing the user to map particular sensors 12 to particular ones of the control outputs 40 and/or diagnostic outputs 44. Such mapping comprises identifying which individual ones among the signal lines comprising the outputs 40 and/or 44 will be exercised in response to intrusion detections reported by a particular sensor 12, or it comprises when/how any or all of the outputs 40 and/or 44 are controlled in response to such intrusion detection reports.

In another embodiment, the apparatus 10 is configured for detecting intrusions within large areas (or volumes), where the monitored area (or volume) contains multiple disjoint or overlapping monitoring areas (or volumes). According to this configuration, the apparatus 10 includes at least one sensor 12, which detects intrusions into portions of the monitored zone 14, which is an area or volume.

As before, the apparatus 10 includes a control unit 32 that associates intrusions into respective portions of the monitored zone with control outputs 40 or 44, which are then used for machine control or diagnostic functions. A communication interface 34 communicatively links the control unit 32 to the sensors 12, allowing each sensor 12 to communicate intrusion status with respect to its configured boundaries 18 to the control unit 32.

Further, the control unit 32 includes a configuration interface 48 that allows users to configure individual sensors 12 and further to configured the control unit's behavior with respect to those sensors 12, using an external configuration device 50, such as a laptop computer. Facilitating such operation, a configuration program—e.g., stored in whole or in part in program/data memory 38—allows users to create monitoring boundaries 18 on a per-sensor or per sensor-group basis, including assigning particular sensor configurations to particular sensors 12. Correspondingly, the control unit 32 is configured to transfer the sensor configuration data to the targeted sensors 12 over the communication interface 34. For example, the configuration program allows the user to set the safety parameters of the sensor, such as object detection size and speed of detection (response time), along with associating or otherwise mapping detected intrusions into the respective portions of the monitored zone 14 to particular control and/or diagnostic outputs 40 and 44. Each sensor 12 detects such intrusions into its respective portion of the monitored zone 14, based on the corresponding boundaries 18 configured for that sensor 12.

Figure 4:
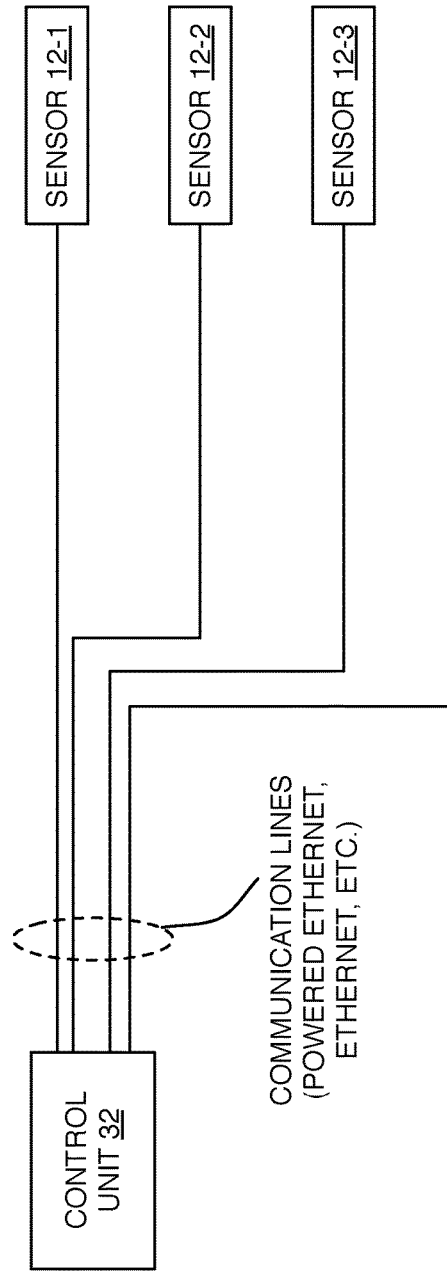
FIGS. 4-6 are block diagrams of various embodiments of a monitoring apparatus, illustrating different communication interface configurations for the plurality of sensors and control unit comprising the apparatus.

Thus, in one or more aspects, the teachings herein provide a monitoring system or apparatus 10 that includes one or more sensors 12 (as noted, alternately referred to as "sensor modules" or "sensor heads"), along with a control module 32. The control unit 32 includes a communication interface 34 that communicatively links the control unit 32 to each sensor 12—see FIG. 4, illustrating an embodiment where each sensor 12 links directly to the control unit 32, e.g., using powered or unpowered Ethernet links.

Figure 5:
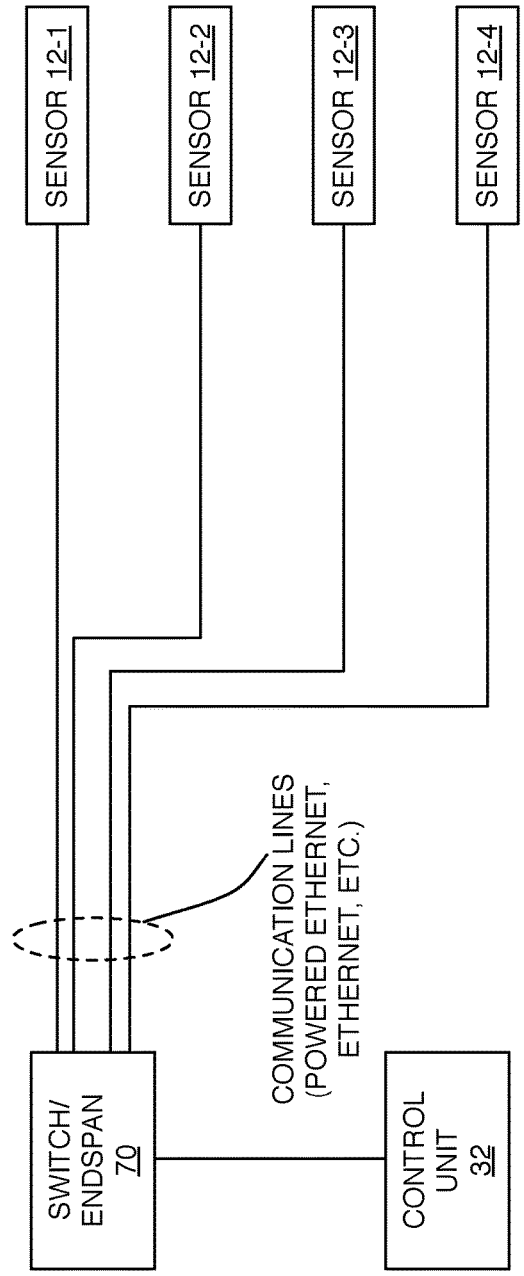

Conversely, FIG. 5 illustrates the use of an aggregator, shown as a "switch" or "endspan" 70, between the control unit proper and the sensors 12. Here, the control unit 32 and its companion aggregator 70 may be regarded as the overall control module and this configuration offers the advantage of standardizing the control unit 32 and its protocol/physical-layer interface with the aggregator 70, while still allowing different models of aggregator 70, each supporting a different type of interface to the sensors 12.

Figure 6:
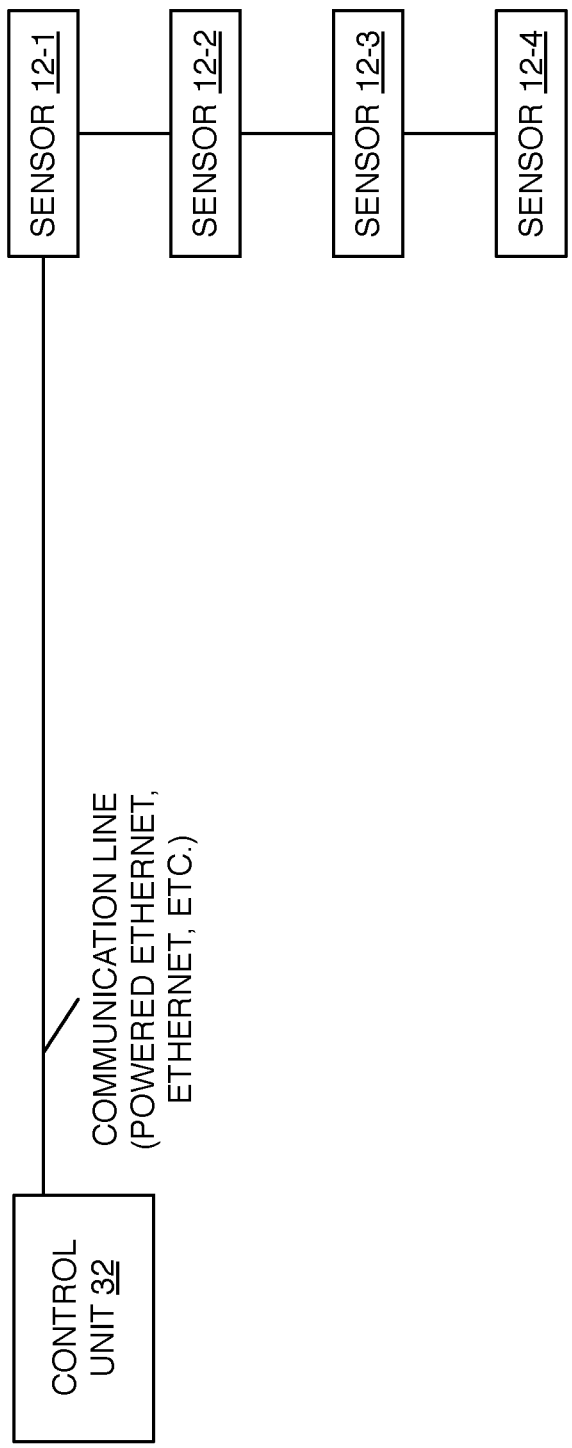

Finally, FIG. 6 illustrates a daisy chain or series of sensors 12 coupled to the control unit 32. Such a configuration may be based on, for example, DeviceNet or etherCAT. In a more general sense, such configurations may use addressable sensors 12, where the communication protocol between the control unit 32 and the sensor heads 32 supports sensor addresses or sensor IDs, such that configuration data is packaged into messages directed to an identified one of the sensors 12 in the chain.

Regardless, each sensor 12 is configurable with multiple monitoring boundaries 18, and performs a monitoring function for each configured boundary. As noted, the control module 32 is connected to the sensor module(s) though a fast communication interface, such as Ethernet, and it includes a number of control outputs 40, some or all of which may be safety-critical control outputs used to control machinery 42 that may be dangerous to people inside the monitoring zone 14.

The control unit 32 in one or more embodiments further includes a number of non-safety outputs 44, which are used, for example, to provide diagnostic functionality and/or signaling to external monitoring and control systems 46.

Still further, the control unit 32 in one or more embodiments includes a number of inputs 52, which may further be used to actuate specific functionality such as additional monitoring cases, modes or reset functions at the control unit 32.

Note, too, that the diagnostic input/output (I/O) 44 includes a diagnostic display in one or more embodiments of the control unit 32. When included, the diagnostic display provides diagnostic information about environmental conditions and/or device errors.

Notably, however, the processing tasks necessary for detecting objects according the defined boundaries 18 are performed in each sensor 12. That is, as noted, each sensor 12 is configured to monitor at least at portion of the monitoring zone 14, according to boundaries 18 configured for that sensor 12. Objects are detected, subject to any size, persistence, or other "qualification" requirements that prevent false detections. Further each sensor 12 communicates object intrusion status to the control unit 32, which reacts to the status information from each sensor 12 according to its configured behavior. As between the control unit 32 and the sensors 12, the sensors 12 perform most of the processing, or at least the sensors 12 perform the most complex processing, e.g., laser scanning, 3D imaging/ranging.

This aspect of the apparatus 10 allows the control unit 32 to be relatively inexpensive, as was noted earlier. The control unit 32 therefore represents a comparatively small portion of the cost of guarding a particular installation, machine or vehicle. Moreover, since the amount of data required to communicate object intrusion is modest, many sensors 12 can be used with a single control unit 32 without placing heavy requirements on the communication interface between the control unit 32 and the sensors 12. Finally, because the control unit 32 associates or otherwise relates multiple monitoring cases to a comparatively small number of outputs 40/44, the wiring burden is reduced for many installations.

Turning to other aspects, when configuring the monitoring zone of a 2D or 3D camera system it is known to use a computer to create "virtual boundaries" that are mapped onto area or volume of the monitoring zone. However, when there is an intrusion, it is not always possible to locate the specific region corresponding to the intrusion. For this reason, various diagnostics have been used, among them (1) individual beam indicators on for safety light curtains, and (2) individual sector indicators on safety laser scanners. In each case, it is also possible to connect an external device, such as a PC or video monitor, to display an image of the area or volume of the monitoring zone. The displayed image includes some depiction of the monitored boundary, along with a corresponding depiction of the measurement data. Together these diagnostics allow the user to locate with precision where the intrusion is happening, and take countermeasures if necessary.

However, in cases where the sensor(s) are remote from the user, such diagnostic aids may be unhelpful. For example, such status indicators may be too numerous to practically implement, or they may be too far away to be visible to the user requiring diagnostic information. One solution is to connect an external diagnostic device, such as a PC or video monitor, which allows the user to monitor an image of the zone, superimposed with boundaries and measurement data. In cases where the sensor is far away from the monitored boundary, or does not share a similar vantage point to the zone as a typical user might, it becomes difficult for a user to associate the intrusion diagnostic with a physical location in any way that is intuitively easy to understand.

At least one embodiment of the apparatus 10 contemplated herein solves the above problem by sharing a common coordinate frame among its multiple sensors 12. This common coordinate frame allows the sensors to be referred to a common monitoring boundary 18 or boundaries 18. In the simplest case of two sensors 12, e.g., sensors 12-1 and 12-2, a set of external points in the scene that are visible to both sensors 12 are used to establish a common origin. In the more complicated case of multiple sensors 12 covering a large field of view, a common origin is established by requiring overlapping fields of view 16 for at least a subset of the sensors 12.

One of the advantages gained through use of the common coordinate frame of reference is that such use allows the boundaries 18 of a given sensor 12 to be viewed by any other sensor 12. This feature allows users of the apparatus 10 to view the boundary 18 of a particular sensor 12 from multiple vantage points. In turn, this ability allows users to create more intuitive diagnostics for creating boundaries 18, and for diagnostic monitoring.

Figure 7:
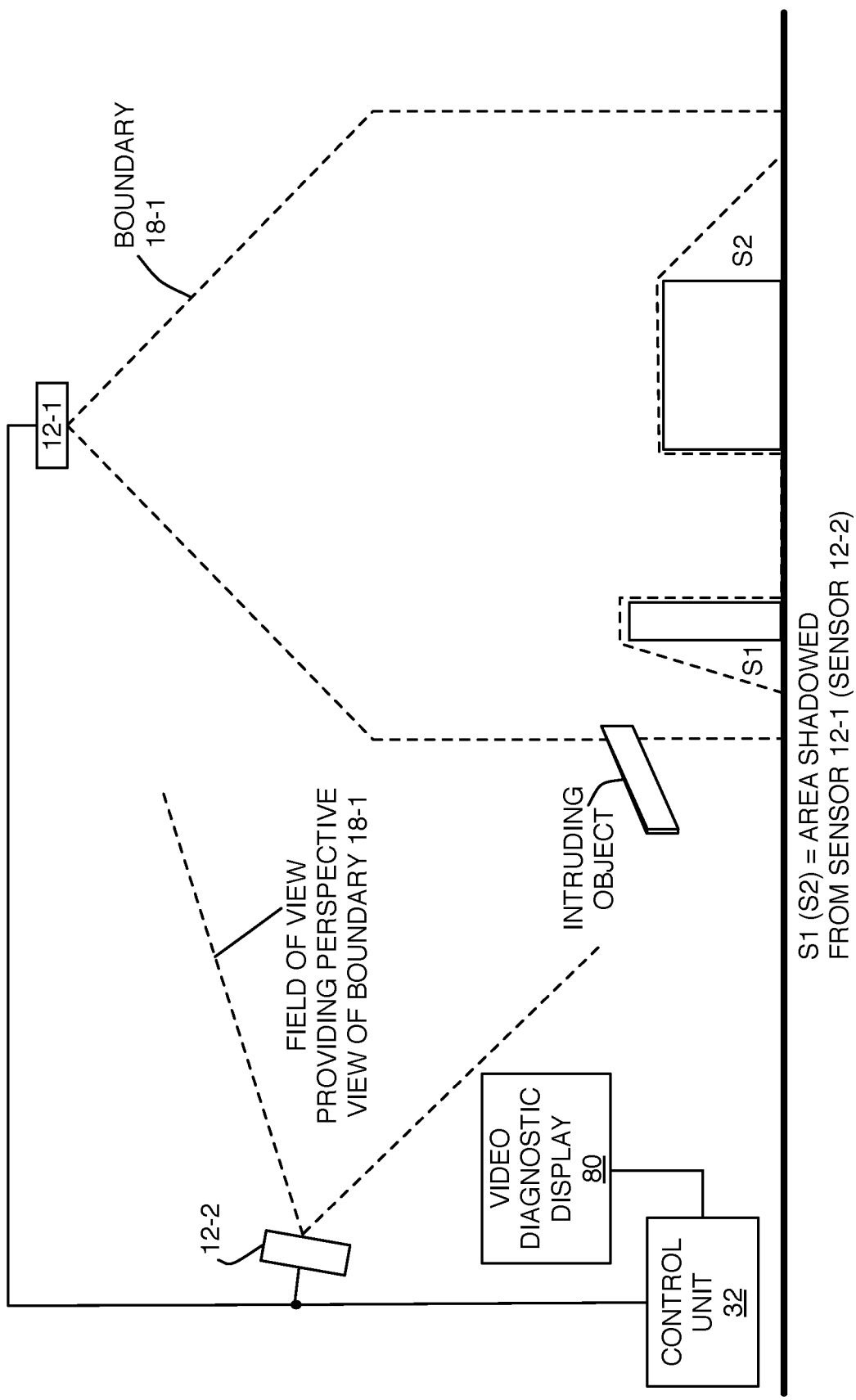
FIG. 7 is a block diagram illustrating the use of a common coordinate frame of reference between two sensors.

By way of example, consider FIG. 7, which shows a boundary 18-1 being monitored by a sensor 12-1. Sensor 12-2 also has a view of boundary 18-1 and much of same zone monitored by sensor 12-1. Note that positional adjustment of sensor 12-1 (e.g. to a typical user vantage point) allows a more intuitive monitoring diagnostic to be realized, through, for example, an online feed of video from sensor 12-2, with a superposition of boundary 18-1, such as may be shown in a video diagnostic display 80, and an indication of the point when intrusions occur.

Thus, in at least one embodiment, the control unit 32 is configured to provide a user configuration interface and to set or adjust the configured boundaries of the sensors based at least in part on user inputs received via the user configuration interface. For example, in at least one such embodiment, the control unit 32 is configured to: receive field of view data from a first one of the sensors 12; receive or generate data representing a displayed boundary representing the configured boundary 18 of a second one of the sensors 12 as seen from the perspective of the first sensor 12; provide the field of view data and the data representing the displayed boundary via the user configuration interface; adjust the data representing the displayed boundary responsive to user inputs; and adjust the configured boundary 18 of the second sensor 12 in accordance with the adjustments made to the displayed boundary.

As a further advantage for cases in which the fields of view 16 for two sensors 12 overlap, the ability to view the configured boundary 18 of one sensor from the perspective of another one of the sensors 12 is used to improve diagnostics (e.g. using the diagnostic display 80 shown in FIG. 7). This capability is useful for diagnostics because the view of a 3D boundary of a given sensor may be difficult to interpret when seen from the perspective of that given sensor.

For example, the control unit 32 outputs a video feed from a first sensor 12 showing, from the perspective of the first sensor 12, the boundary 18 of a second sensor 12, for the area monitored by the second sensor 12. Indeed, the first sensor 12 does not necessarily need to be a safety device, but could be a web or mobile camera, for instance, whose FOV overlaps with the second sensor 12 and can be registered to a common coordinate system.

As a further advantage, video or images of multiple views of a configured boundary 18 can be compared to assess the location and size of shadowed areas (e.g., S1 in FIG. 7). Yet another advantage of using a common coordinate reference is that overlapping boundaries 18 can be consolidated, which can in turn lead to the consolidation of safety outputs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A monitoring apparatus comprising:
   first and second cameras having corresponding fields of view, wherein the first camera is a stereoscopic camera pair configured for determining ranges to objects detected within its field of view, and wherein, in a deployed arrangement, the first and second cameras are referenced to a common coordinate frame and the first camera images a scene from a first perspective and the second camera images the scene from a second perspective that is different than the first perspective; and
   a control unit comprising one or more processing circuits configured to send sensor configuration data to the first camera via a communication interface of the control unit, the sensor configuration data defining a configured monitoring boundary within the common coordinate frame, wherein object intrusions detected by the first camera with respect to the configured monitoring boundary trigger the first camera to send intrusion detection information to the control unit, and wherein the control unit is further configured to modify image data received from the second camera via the communication interface by superimposing a graphical depiction of the configured monitoring boundary of the first camera, as seen from the second perspective, and output the modified image data via a configuration interface of the control unit, for display to a user of the monitoring apparatus;
   wherein the control unit comprises one or more outputs configured to perform a safety-related switching function of an external machine, and wherein the control unit configuration data includes configuration information specifying a behavior of the control unit for controlling the switching function with respect to detected intrusions of objects in the configured monitoring boundary of the first camera; and
   wherein the first camera is one among two or more stereoscopic cameras included in the monitoring apparatus and, wherein, in a deployed arrangement, the two or more stereoscopic cameras are referenced to the common coordinate frame and have respectively configured monitoring boundaries, and wherein the configuration information specifies the behavior of the control unit for controlling the switching function on a per camera basis, with respect to the two or more stereoscopic cameras.

2. The monitoring apparatus of claim 1, wherein the control unit is configured to generate the sensor configuration data according to control unit configuration data received via the configuration interface.

3. The monitoring apparatus of claim 1, wherein the control unit is configured to adjust the graphical depiction responsive to boundary adjustments input by the user via the configuration interface and generate updated sensor configuration data for the first camera, to reflect the boundary adjustments.

4. The monitoring apparatus of claim 1, wherein the image data received from the second camera is an online video feed from the second camera, and wherein the control unit is further configured to include in the modified image data, as a modified online video feed, indications of points of intrusion detected by the first camera with respect to the configured monitoring boundary.

5. The monitoring apparatus of claim 4, wherein the control unit is configured to provide the modified online video feed during a run-time mode of operation of the monitoring apparatus, during which the monitoring apparatus performs a guarding function with respect to a volume contained within the configured monitoring boundary of the first camera.

6. The monitoring apparatus of claim 1, wherein the monitoring apparatus includes a video diagnostic display for outputting the modified image data.

7. The monitoring apparatus of claim 1, wherein the configuration interface is a computer interface configured for coupling the monitoring apparatus to an external computer, and wherein the control unit is configured to output the modified image data for display on the external computer.

8. The monitoring apparatus of claim 1, wherein the second camera is one of the two or more stereoscopic cameras.

9. The monitoring apparatus of claim 1, wherein the configured monitoring boundary comprises a three-dimensional boundary defining a bounded volume.

* * * * *